(12) United States Patent
Liu (10) Patent No.: US 11,231,755 B2
(45) Date of Patent: Jan. 25, 2022

(54) METHOD AND APPARATUS FOR DISPLAYING IMAGE INFORMATION (71) Applicant: ADVANCED NEW TECHNOLOGIES CO., LTD., Grand Cayman (KY)

(72) Inventor: Lindong Liu, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/390,662

(22) Filed: Apr. 22, 2019

(65) Prior Publication Data

US 2019/0243428 A1    Aug. 8, 2019

Related U.S. Application Data

(63) Continuation of application No. PCT/CN2017/106488, filed on Oct. 17, 2017.

(30) Foreign Application Priority Data

Oct. 24, 2016 (CN) .......... 201610940626.X (51) Int. Cl.
*G06F 1/16* (2006.01)
*G06F 21/32* (2013.01)
(Continued)

(52) U.S. Cl.
CPC ........ *G06F 1/1694* (2013.01); *G06F 3/04847* (2013.01); *G06F 21/32* (2013.01);
(Continued)

(58) Field of Classification Search
CPC .... G06F 1/1694; G06F 1/1626; G06F 3/0346; G06F 2200/1637; G06F 2200/1614; G06Q 20/3274; H04W 88/02; H04W 12/06
See application file for complete search history.

(56) References Cited

U.S. PATENT DOCUMENTS 7,289,102 B2 * 10/2007 Hinckley .............. G06F 1/1626
345/156
8,803,999 B2 8/2014 Wilson et al.
(Continued)

FOREIGN PATENT DOCUMENTS

CN        102902943 A    1/2013
CN        102984369 A    3/2013
(Continued)

OTHER PUBLICATIONS

Non-final rejection and Search Report for Taiwanese Application No. 106131350 dated Apr. 11, 2019 (6 pages).
(Continued)

*Primary Examiner* — Dismery Mercedes (57) ABSTRACT

Methods, systems, and apparatus, including computer programs encoded on computer storage media, for displaying image information are provided. One of the methods includes: acquiring a rotation angle of a terminal; acquiring a rotation duration of the rotation of the terminal; determining whether the rotation angle reaches a preset threshold value; determining whether the rotation duration is shorter than a preset duration; and when the rotation angle reaches the preset threshold value, and when the rotation duration is shorter than the preset duration, displaying image information.

8 Claims, 6 Drawing Sheets

(51) Int. Cl.
*G06F 21/84* (2013.01)
*G06F 3/0484* (2013.01)

(52) U.S. Cl.
CPC ...... *G06F 21/84* (2013.01); *G06F 2200/1614* (2013.01); *G06F 2200/1637* (2013.01)

(56) References Cited

U.S. PATENT DOCUMENTS

| | | | |
|---|---|---|---|
| 8,826,184 B2 | 9/2014 | Kwak et al. | |
| 8,866,810 B2 | 10/2014 | Cho et al. | |
| 8,903,141 B2* | 12/2014 | Heilpern | G06K 9/00013 |
| | | | 382/124 |
| 8,963,962 B2 | 2/2015 | Ubillos | |
| 9,030,446 B2 | 5/2015 | Mistry et al. | |
| 9,137,437 B2 | 9/2015 | Choi et al. | |
| 9,165,533 B2* | 10/2015 | Paulson | G09G 5/38 |
| 9,652,135 B2 | 5/2017 | Seo et al. | |
| 10,185,416 B2 | 1/2019 | Mistry et al. | |
| 10,318,135 B2* | 6/2019 | Xu | G06F 3/0346 |
| 2006/0103733 A1* | 5/2006 | Grady | G06F 1/3203 |
| | | | 348/208.3 |
| 2008/0045207 A1 | 2/2008 | Ahn et al. | |
| 2008/0259094 A1* | 10/2008 | Kim | G06T 3/606 |
| | | | 345/651 |
| 2009/0195554 A1 | 8/2009 | Hu | |
| 2009/0262661 A1 | 10/2009 | Ueda et al. | |
| 2010/0007603 A1* | 1/2010 | Kirkup | G06F 1/1616 |
| | | | 345/158 |
| 2012/0274775 A1 | 11/2012 | Reiffel | |
| 2012/0326994 A1 | 12/2012 | Miyazawa et al. | |
| 2013/0026241 A1 | 1/2013 | Sakahashi et al. | |
| 2013/0069987 A1 | 3/2013 | Choe | |
| 2013/0222231 A1* | 8/2013 | Gardenfors | G06F 1/1626 |
| | | | 345/156 |
| 2013/0278622 A1* | 10/2013 | Sun | G06Q 20/3276 |
| | | | 345/589 |
| 2014/0123273 A1* | 5/2014 | Matus | G06F 21/30 |
| | | | 726/17 |
| 2014/0143678 A1 | 5/2014 | Mistry et al. | |
| 2014/0362117 A1* | 12/2014 | Paulson | G06F 1/1694 |
| | | | 345/659 |
| 2014/0375574 A1* | 12/2014 | Kim | G06F 1/1626 |
| | | | 345/173 |
| 2015/0089631 A1* | 3/2015 | Bao | H04W 12/08 |
| | | | 726/16 |
| 2015/0116086 A1* | 4/2015 | Kim | G06F 21/32 |
| | | | 340/5.83 |
| 2015/0242100 A1* | 8/2015 | Sohlstrom | G06F 3/0346 |
| | | | 345/649 |
| 2015/0332031 A1 | 11/2015 | Mistry et al. | |
| 2016/0014921 A1* | 1/2016 | Francois | H05K 5/0234 |
| | | | 361/807 |
| 2016/0147994 A1* | 5/2016 | Lu | H04L 63/0853 |
| | | | 726/26 |
| 2016/0162169 A1 | 6/2016 | Xu | |
| 2016/0163289 A1* | 6/2016 | Masuko | G06F 1/1686 |
| | | | 345/659 |
| 2016/0171281 A1 | 6/2016 | Park et al. | |
| 2016/0171486 A1* | 6/2016 | Wagner | G06Q 20/3278 |
| | | | 705/39 |
| 2016/0224966 A1* | 8/2016 | Van Os | G06Q 20/40145 |
| 2016/0300374 A1* | 10/2016 | Woo | G06F 3/042 |
| 2016/0314462 A1* | 10/2016 | Hong | G09C 5/00 |
| 2016/0364017 A1* | 12/2016 | Wang | G09G 3/20 |
| 2017/0109564 A1* | 4/2017 | Seo | G06K 9/00067 |
| 2017/0277499 A1 | 9/2017 | Liang et al. | |
| 2018/0006821 A1* | 1/2018 | Kinagi | H04L 9/3234 |
| 2018/0101711 A1* | 4/2018 | D'Souza | G06K 9/228 |

FOREIGN PATENT DOCUMENTS

| | | |
|---|---|---|
| CN | 103472993 A | 12/2013 |
| CN | 104317541 A | 1/2015 |
| CN | 104375628 A | 2/2015 |
| CN | 105224840 A | 1/2016 |
| CN | 105677202 A | 6/2016 |
| JP | 2003-199155 A | 7/2003 |
| JP | 2010-277465 A | 12/2010 |
| JP | 2012-194842 A | 10/2012 |
| JP | 2016-091158 A | 5/2016 |
| KR | 20-0336965 Y1 | 12/2003 |
| KR | 101375727 B1 | 3/2014 |
| KR | 10-1450013 B1 | 10/2014 |
| KR | 10-2016-0121287 A | 10/2016 |
| TW | 200934426 A | 8/2009 |
| WO | 2015/056038 A1 | 4/2015 |
| WO | 2015/093734 A1 | 6/2015 |
| WO | 2016/081274 A1 | 5/2016 |
| WO | 2016/123309 A1 | 8/2016 |

OTHER PUBLICATIONS

Written Opinion of the International Searching Authority and International Search Report for PCT Application No. PCT/CN2017/106488 dated Jan. 16, 2018 (15 pages).
International Preliminary Report on Patentability Chapter I for PCT Application No. PCT/CN2017/106488 dated May 9, 2019 (12 pages).
First Search for Chinese Application No. 201610940626.X dated Sep. 1, 2019 (1 page).
First Office Action for Chinese Application No. 201610940626.X dated Sep. 25, 2019 (5 pages).
Search Report for European Application No. 17865111.3 dated Apr. 29, 2020.
Supplementary Search Report for Chinese Application No. 201610940626.X dated Feb. 24, 2020.
Second Office Action for Chinese Application No. 201610940626.X dated Mar. 3, 2020.
Third Office Action for Chinese Application No. 201610940626.X dated Apr. 2, 2020.
Written Opinion for Singaporean Application No. 11201903647R dated May 14, 2020.
Office Action for Korean Application No. 10-2019-7014123 dated Jul. 22, 2020.
Office Action for Japanese Application No. 2019-522327 dated Aug. 25, 2020.

* cited by examiner

METHOD AND APPARATUS FOR DISPLAYING IMAGE INFORMATION

CROSS REFERENCE TO RELATED APPLICATIONS

The present application is a continuation application of the International Patent Application No. PCT/CN2017/106488, filed on Oct. 17, 2017, and titled "Method and Apparatus for Displaying Image Information," which claims priority to Chinese Patent Application No. 201610940626.X filed on Oct. 24, 2016 and entitled "Method and Apparatus for Displaying Image Information." The entire contents of all of the above applications are incorporated herein by reference in their entirety.

TECHNICAL FIELD

The present application relates to the field of computer technologies, and in particular, to a method and an apparatus for displaying image information.

BACKGROUND

When a user wants to open a page for displaying image information in an application (APP), the user typically needs to perform certain operations, such as clicking a button corresponding to the page.

In a scenario of regular payments, when a user uses a payment APP to make a payment, the user needs to display a QR code for payment to a payee. The payee can receive the payment by scanning the displayed QR code using a barcode scanner. The user needs to open a page of the payment QR code during the payment, and the following steps need to be completed by the user during the payment process: first, opening a payment APP in a mobile phone; second, in the payment APP interface, clicking the "payment" button and switch to the QR code page; and third, rotating the mobile phone to show the QR code displayed on the mobile phone to the payee.

As described above, the user needs to perform at least three actions to complete the payment; therefore, the process of displaying certain image information by a terminal is relatively slow.

SUMMARY

The present specification provides a method and an apparatus for displaying image information to solve the problem in current technologies that the process of displaying image information on a terminal is relatively slow.

In some embodiments, a method for displaying image information comprises: acquiring a rotation angle of a terminal; acquiring a rotation duration of the rotation of the terminal; determining whether the rotation angle reaches a preset threshold value; determining whether the rotation duration is shorter than a preset duration; and when the rotation angle reaches the preset threshold value, and when the rotation duration is shorter than the preset duration, displaying image information.

In some embodiments, the acquiring a rotation angle of a terminal comprises: when a preset Application (APP) on the terminal is activated, acquiring the rotation angle of the terminal, wherein the image information is included in the preset APP.

In some embodiments, the acquiring, using a sensor, a rotation duration of the rotation of the terminal comprises: acquiring a first time when the terminal begins to rotate; acquiring a second time when the rotation angle of the terminal reaches a preset threshold value; and determining a time difference by deducting the first time from the second time as the rotation duration.

In some embodiments, the preset threshold value is an angle range.

In some embodiments, before the displaying image information, the method further comprises: determining whether a distance between the terminal and an object is less than a preset distance; and the displaying image information comprises: displaying the image information when the distance is less than the preset distance.

In some embodiments, before the displaying image information, the method further comprises: determining whether a fingerprint of a user of the terminal is correct; and the displaying image information comprises: displaying the image information when the user's fingerprint is correct.

In some embodiments, the method further comprises: when the user's fingerprint is incorrect, placing the terminal in an inoperable locked state.

In some embodiments, after the placing the terminal in an inoperable locked state, the method further comprises: acquiring location information of the terminal and uploading the location information to a remote server.

In some embodiments, an apparatus for displaying image information comprises: a first acquiring unit configured to acquire a rotation angle of a terminal; a second acquiring unit configured to acquire, using a sensor, a rotation duration of the rotation of the terminal; a first determining unit configured to determine whether the rotation angle reaches a preset threshold value; a second determining unit configured to determine whether the rotation duration is shorter than a preset duration; and a display unit configured to, when the rotation angle reaches the preset threshold value, and when the rotation duration is shorter than the preset duration, display image information.

In some embodiments, the first acquiring unit comprises: a first acquiring sub-unit configured to acquire, when a preset Application (APP) on the terminal is activated, the rotation angle of the terminal, wherein the image information is included in the preset APP.

In some embodiments, the second acquiring unit comprises: a second acquiring sub-unit configured to acquire a first time when the terminal begins to rotate; a third acquiring sub-unit configured to acquire a second time when the rotation angle of the terminal reaches a preset threshold value; and a determining sub-unit configured to determine a time difference by deducting the first time from the second time as the rotation duration.

In some embodiments, the preset threshold value is an angle range.

In some embodiments, the display unit comprises: a first display sub-unit configured to, when the rotation angle reaches the preset threshold value, and when the rotation duration is shorter than the preset duration, determine whether a distance between the terminal and an object is less than a preset distance; and a second display sub-unit configured to display the image information when the distance is less than the preset distance.

In some embodiments, the display unit comprises: a first display sub-unit configured to, when the rotation angle reaches the preset threshold value, and when the rotation duration is shorter than the preset duration, determine whether a fingerprint of a user of the terminal is correct; and a second display sub-unit configured to display the image information when the user's fingerprint is correct.

In some embodiments, the apparatus further comprises: a locking sub-unit configured to, when the user's fingerprint is incorrect, place the terminal in an inoperable locked state.

In some embodiments, after the locking sub-unit, the apparatus further comprises: an uploading sub-unit configured to acquire location information of the terminal and upload the location information.

In some embodiments, a system for displaying image information comprises one or more processors and one or more non-transitory computer-readable memories coupled to the one or more processors and configured with instructions executable by the one or more processors to cause the system to perform operations comprising: acquiring a rotation angle of a terminal; acquiring a rotation duration of the rotation of the terminal; determining whether the rotation angle reaches a preset threshold value; determining whether the rotation duration is shorter than a preset duration; and when the rotation angle reaches the preset threshold value, and when the rotation duration is shorter than the preset duration, displaying image information.

In some embodiments, a non-transitory computer-readable storage medium is configured with instructions executable by one or more processors to cause the one or more processors to perform operations comprising: acquiring a rotation angle of a terminal; acquiring a rotation duration of the rotation of the terminal; determining whether the rotation angle reaches a preset threshold value; determining whether the rotation duration is shorter than a preset duration; and when the rotation angle reaches the preset threshold value, and when the rotation duration is shorter than the preset duration, displaying image information.

In the embodiments of the present specification, when a rotation angle of a terminal reaches a preset threshold value, and when the rotation duration is shorter than a preset duration, image information can be directly displayed without the need for the user to perform further operations. As such, the image information can be automatically displayed through rotating the terminal by the user. Since the user does not need to click a button for displaying image information, the operation time is reduced to enable the terminal to rapidly display the image information; moreover, the user can be prevented from clicking an incorrect button, thereby achieving correct display of image information.

DETAILED DESCRIPTION

Exemplary embodiments will be described in detail below, and the examples of the embodiments are illustrated in the accompanying drawings. When the description below involves the accompanying drawings, identical numbers in different drawings represent identical or similar elements, unless otherwise indicated. The implementation manners described in the following exemplary embodiments do not represent all implementation manners that are consistent with the present specification. Conversely, they are merely examples of apparatuses and methods that are consistent with some aspects of the present specification as described in detail in the appended claims.

Terms used in the present specification are for the purpose of describing particular embodiments, rather than limiting the present specification. "A," "the," and "said" in the singular form used in the present specification and the appended claims are intended to include the plural form as well, unless clearly indicated in the context to have other meanings. The term "and/or" used herein refers to any or all possible combinations of one or more associated listed items.

Terms such as first, second, third, etc. may be used in the present specification to describe various information, but the information shall not be limited to these terms. These terms are used to differentiate information of the same type from another. For example, without departing from the scope of the present specification, first information may also be referred to as second information, and similarly, second information may also be referred to as first information. Depending on the context, the term "if" used herein may be construed as "when . . . " or "at the time of . . . " or "in response to determining."

Application scenarios in which the embodiments of the present specification can be applied to display image information will be introduced herein.

In the payment scenario described above, when a user needs to display a QR code for payment, the user can simply rotate the mobile phone to automatically display the QR code information for payment. As such, since the user does not need to click a button for displaying the QR code information, the operation time can be reduced to enable the terminal to rapidly display the QR code information; moreover, the user can be prevented from clicking an incorrect button, thereby achieving correct display of the QR code information.

In a social networking scenario of an instant messaging APP, a friend can be added in the instant messaging APP by scanning a QR code. When a user needs to display a QR code to add a friend, the user can simply rotate the mobile phone to automatically display the QR code information corresponding to the user. The friend can scan the displayed QR code to complete the friend addition into the instant messaging APP. As such, since the user does not need to click a button for displaying the QR code information, the operation time can be reduced to enable the terminal to rapidly display the QR code information; moreover, the user can be prevented from clicking an incorrect button, thereby achieving correct display of the QR code information.

The embodiments of the present specification can also be applied in scenarios such as exchanging electronic business cards, directory, etc., in all of which a user just needs to rotate a terminal to automatically display image information.

In an exemplary application, the image information may be information displayed in an image, such as a QR code, a barcode, etc.

Figure 1:
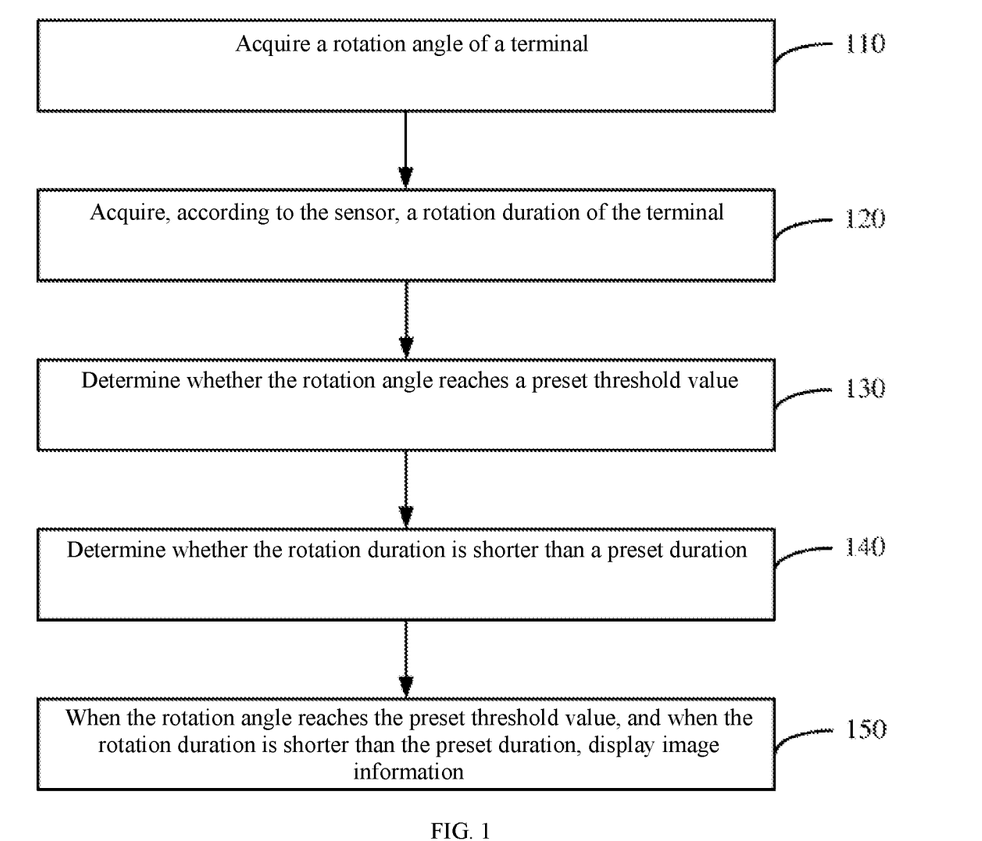
FIG. 1 is a flow chart of a method for displaying image information according to some embodiments.

FIG. 1 is a flow chart of a method for displaying image information according to some embodiments. The method comprises the following steps:

Step 110: acquiring a rotation angle of a terminal. The rotation angle may be acquired from a sensor configured for detecting the rotation angle of the terminal. The sensor may be included in the terminal.

In some embodiments, the terminal may be a client device in terms of hardware, such as a tablet computer, a smart phone, a handheld computer, a personal digital assistant ("PDA"), or any other wired or wireless processor-driven device.

The terminal is installed with a sensor configured for detecting a rotation angle of the terminal. The sensor configured for detecting a rotation angle of the terminal can include an angular velocity sensor, a movement attitude sensor, etc.

During operations, the sensor can continuously detect the rotation angle of the terminal and report the detected rotation angle.

For example, the step 110 can comprise: acquiring a rotation angle with respect to a preset axis of the terminal.

In some embodiments, in an actual spatial plane, the preset axis may be an axis in any direction.

The preset axis being the X axis is used as an example in the following description: a rotation angle with respect to the X axis is acquired and reported by a sensor configured for detecting a rotation angle of a terminal.

Figure 2:
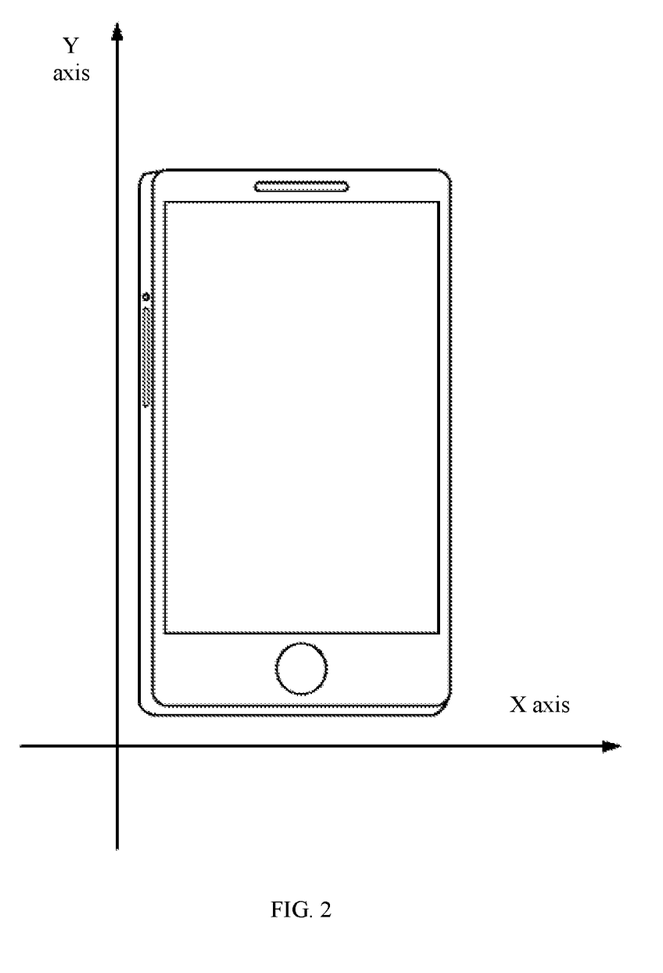
FIG. 2 is a schematic diagram of a terminal before a rotation according to some embodiments.
Figure 4:
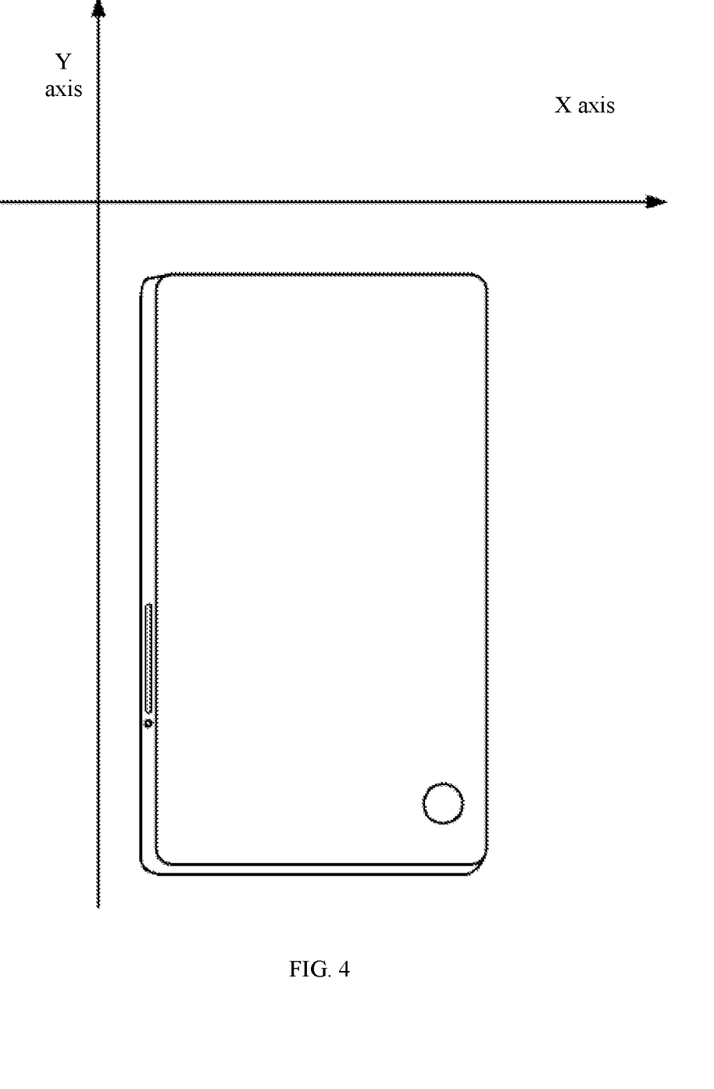
FIG. 4 is a schematic diagram of the terminal after a rotation about the X axis according to some embodiments.

If the user rotates the mobile phone about the X axis, the mobile phone is flipped from the front side (the side having the display screen) to the back side, as shown in FIG. 2 and FIG. 4. Therefore, the acquired rotation angle with respect to the X axis is 180°.

Similarly, the preset axis being the Y axis is used as an example in the following description: a rotation angle with respect to the Y axis is acquired and reported by a sensor configured for detecting a rotation angle of a terminal.

Figure 3:
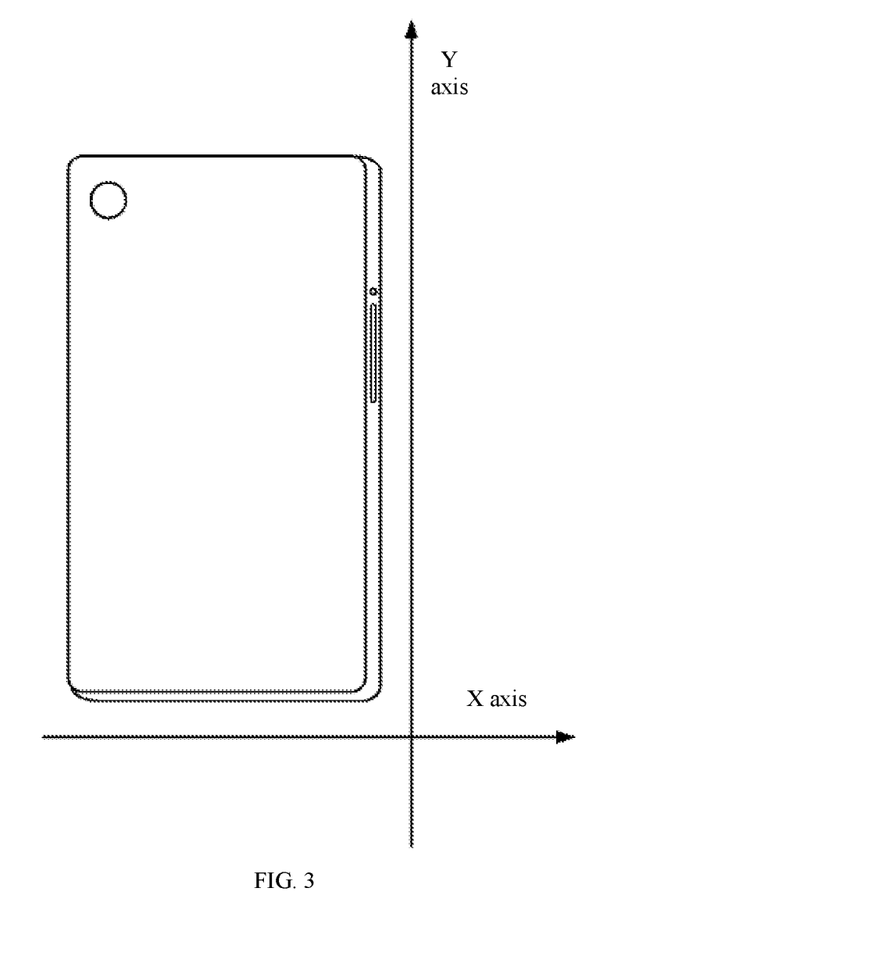
FIG. 3 is a schematic diagram of the terminal after a rotation about the Y axis according to some embodiments.

If the user rotates the mobile phone about the Y axis, the mobile phone is still flipped from the front side (the side having the display screen) to the back side, as shown in FIG. 2 and FIG. 3. Therefore, the acquired rotation angle with respect to the Y axis is 180°.

In some embodiments, the preset axis may be multiple axes, and therefore, the acquired rotation angle may also be about the multiple axes. For example, the preset axes are the X axis and the Y axis.

In some embodiments, the terminal may process the uploaded rotation angle and execute subsequent steps via an operating system, such as the Android system, the IOS system, windows phone, etc. Namely, the execution entity in some embodiments can be the operating system of the terminal.

In some other embodiments, the terminal may process the uploaded rotation angle and execute subsequent steps via a third party APP, such as a payment APP. Namely, the execution entity in the embodiments can be the third party APP of the terminal.

The step 110 can comprise: when a preset Application (APP) on the terminal is activated, acquiring a rotation angle of the terminal.

In some embodiments, the image information can be included in the preset APP.

Figure 5:
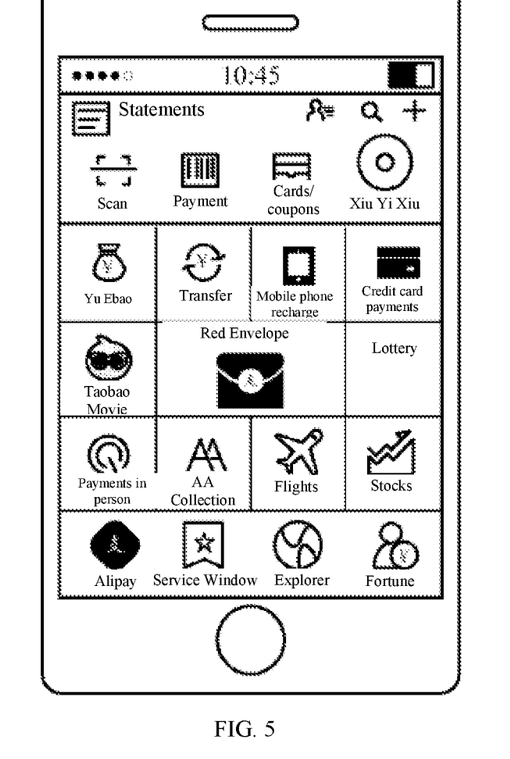
FIG. 5 is a schematic diagram of a homepage of a payment APP according to some embodiments.

With the homepage of a payment APP shown in FIG. 5, when the user successfully enters the homepage of the payment APP, a rotation angle reported by the sensor configured for detecting a rotation angle of the terminal is acquired. Since the terminal carries out subsequent steps through a payment APP, relevant permissions including those for acquiring a reported rotation angle and a rotation duration in the subsequent step can be acquired after entering the payment APP.

In some embodiments, the terminal displays the image information through controls by a third party APP, and therefore, the preset APP needs to be opened first before the step 110 and subsequent steps can be carried out.

Step 120: acquiring, according to the sensor, a rotation duration of the rotation of the terminal.

In some embodiments, acquiring, according to the sensor, a rotation duration of the rotation of the terminal can, for example, comprise the following steps:

A1: acquiring a first time when the terminal begins to rotate (e.g., as detected by the sensor);

A2: acquiring a second time when the rotation angle of the terminal reaches a preset threshold value; and A3: determining a time difference by deducting the first time from the second time as the rotation duration.

At A1, typically, at the moment when the terminal begins to rotate, the rotation would be detected by the sensor, and the sensor would return a beginning signal to notify the terminal to be prepared for receiving a reported rotation angle; therefore, the time when the beginning signal returned by the sensor is received is the first time.

The sensor and the sensor configured for detecting a rotation angle of the terminal can be the same.

At A3, for example, the first time when the user begins to rotate the mobile phone is 10 milliseconds after 13:12:30; the second time when the rotation angle of the mobile phone reaches 150° (the preset threshold value) is 800 milliseconds after 13:12:30; the calculated time difference is 790 milliseconds, i.e., 0.79 seconds, and therefore, the rotation duration of the terminal is 0.79 seconds.

In addition to the above-described, in some other embodiments, the step 120 of acquiring, according to the sensor, a rotation duration of the terminal can, for example, comprise the following steps:

B1: acquiring a first time when the terminal begins to rotate as detected by the sensor;

B2: acquiring a second time when the sensor detects that the terminal stops the rotation; and B3: determining a time difference by deducting the first time from the second time as the rotation duration.

At B1, in some embodiments, at the moment when the terminal begins to rotate, the sensor begins to operate and would return a beginning signal to notify the terminal that the detection is started and the terminal needs to be prepared for receiving a reported rotation angle; therefore, the time when the beginning signal returned by the sensor is received is the first time.

The sensor configured for detecting a rotation duration of the terminal and the sensor configured for detecting a rotation angle of the terminal can be the same sensor.

At B2, similarly, when the terminal stops the rotation, the sensor stops the operation and would return a stop signal to notify the terminal that the detection is ended; therefore, the time when the stop signal returned by the sensor is received is the second time.

The sensor and the sensor configured for detecting a rotation angle of the terminal can be the same sensor.

At B3, for example, the first time when the user begins to rotate the mobile phone is 10 milliseconds after 13:12:30; the second time when the user stops the rotation of the mobile phone is 800 milliseconds after 13:12:30; the calculated time difference is 790 milliseconds, i.e., 0.79 seconds, and therefore, the rotation duration of the terminal is 0.79 seconds.

Step 130: determining whether the rotation angle reaches a preset threshold value.

In some embodiments, after the rotation angle of the terminal is acquired, whether the reported rotation angle reaches a preset threshold value needs to be determined;

The preset threshold value can be a manually preset empirical value.

For example, whether the reported rotation angle reaches 120° (i.e., the preset duration) is determined.

Step 140: determining whether the rotation duration is shorter than a preset duration.

In some embodiments, after the rotation duration of the rotation of the terminal is acquired, whether the rotation duration is shorter than a preset duration needs to be determined;

The preset duration can be a manually preset empirical value.

For example, whether the rotation duration is shorter than 1 second (i.e., the preset duration) is determined.

Step 150: when the rotation angle reaches the preset threshold value, and when the rotation duration is shorter than the preset duration, displaying image information.

In some embodiments, the image information can be displayed when the reported rotation angle reaches the preset threshold value, and when the rotation duration is shorter than the preset duration.

As described above, the image information may be information displayed in an image, such as a QR code, a barcode, etc.

Correspondingly, if the reported rotation angle does not reach the preset threshold value, or if the rotation duration is not shorter than the preset duration, it can be deemed as an invalid operation and the subsequent steps do not need to be executed, e.g., the image information is not displayed.

According to the above-described embodiments, when a rotation angle of a terminal reaches a preset threshold value, and when the rotation duration is shorter than a preset duration, image information can be displayed without the need for the user to perform further operations. As such, the image information can be automatically displayed by the user rotating the terminal. Since the user does not need to click a button for displaying image information, the operation time is reduced to enable the terminal to rapidly display the image information; moreover, the user can be prevented from clicking an incorrect button, thereby achieving correct display of image information.

In some other embodiments of the present specification, the preset threshold value may be an angle range, such as 120° to 180°. If the reported rotation angle is within the angle range, it indicates that the preset threshold value is reached; conversely, if the reported rotation angle is smaller than or exceeds the angle range, it indicates that the preset threshold value is not reached. The use of the angle range may prevent accidental triggering the image display when the user uses the terminal for other purposes.

In some embodiments, by setting a reasonable range of the preset angle, a user can be prevented from incorrectly triggering the rotation angle to reach the preset threshold value while performing other actions.

In some embodiments of the present specification, before the displaying image information, the method may further comprise: determining whether a distance between the terminal and an object detected by a distance sensor is less than a preset distance; and correspondingly, the displaying image information comprises: displaying the image information when the distance is less than the preset distance.

In some embodiments, the terminal is installed with a distance sensor, and the distance sensor can detect a distance between the terminal and a nearby object (e.g., a code scanning device).

In an exemplary application scenario, after a user manually triggers an operation to display image information, there is a demand for actual information exchange. In other words, during the triggered image display state, the user will basically not place the terminal close to objects other than a code scanning device. Therefore, it is practically unlikely for misjudgment to occur. Even if misjudgment occurs as a result of the terminal getting close to an object such as a body or a wall, the object is close to and blocks the front of the terminal screen, which does not impact the security of the information image. Therefore, the image information will not be seen by others and the payment security can be improved.

In some other embodiments of the present specification, before the displaying image information, the method may further comprise: determining whether a fingerprint of a user of the terminal is correct; and correspondingly, the displaying image information comprises: displaying the image information when the user's fingerprint is correct.

In some embodiments, when the user rotates the terminal, the user must press a finger on the fingerprint scanning button of the terminal.

When the user's fingerprint is correct, it indicates that the person rotating the terminal at this moment is the owner of the terminal, and the image information can be displayed.

In some embodiments, it is ensured, by using the user's fingerprint, that the user who rotates the terminal is the owner of the terminal, thereby improving the payment security and preventing losses to the owner if the terminal is used by others.

In some other embodiments of the present specification, the method further comprises: when the user's fingerprint is incorrect, placing the terminal in an inoperable locked state.

In some embodiments, when the user's fingerprint is incorrect, it indicates that the terminal may be stolen. To avoid potential risks (e.g., a contact in the directory is defrauded), the terminal can be locked. In the locked state, the terminal cannot be operated, e.g., the terminal cannot be turned on.

In some other embodiments of the present specification, after placing the terminal in the inoperable locked state, the method further comprises: acquiring location information of the terminal and uploading the location information to a remote server.

In some embodiments, the location information may be recorded by a positioning device installed on the terminal and represents coordinate information of a geographic location. A common positioning device may use the U.S. GPS satellite navigation system, the European Galileo satellite navigation system, the Russian GLONASS satellite navigation system, the Chinese "Beidou" satellite navigation system, or a combination of similar systems. The coordinate information of this type of position is also referred to as mobile positioning. Moreover, the reported location information typically comprises a time stamp of the report, and the time stamp can be a time when the positioning device determines the geographic location.

The location information can be obtained by a network device through conversion based on characteristics of a terminal's signals. For example, a network operator uses the base station coverage principle to obtain location information through base station positioning calculation using the terminal's signals. In the positioning calculation, the terminal typically measures downlink pilot signals from different base stations to obtain the Time of Arrival (TOA) or Time Difference of Arrival (TDOA) of downlink pilots from different base stations. According to the measurement results and combined with the coordinates of the base stations, a trigonometric formula estimation algorithm is typically used to calculate the location of the terminal. For an exemplary location estimation algorithm, multi-base station (3 or more) positioning needs to be considered. There are many algorithms according to current technologies, which are complicated. A higher number of base stations measured by a mobile station means a higher accuracy of the measurement and more significant improvement in the positioning performance.

In addition, the location information can also be a relatively accurate location obtained from joint positioning by base station-assisted positioning and the positioning device in the terminal.

In some embodiments, after the terminal is placed in the inoperable locked state, the location information of the terminal can be uploaded to a server provided by the manufacturer of the terminal, a server provided by the operating system of the terminal, or a server of the payment APP; as such, the user can receive assistance in locating the stolen terminal.

Corresponding to the above-described method embodiments for displaying image information, the present specification further provides embodiments of an apparatus for displaying image information.

Figure 6:
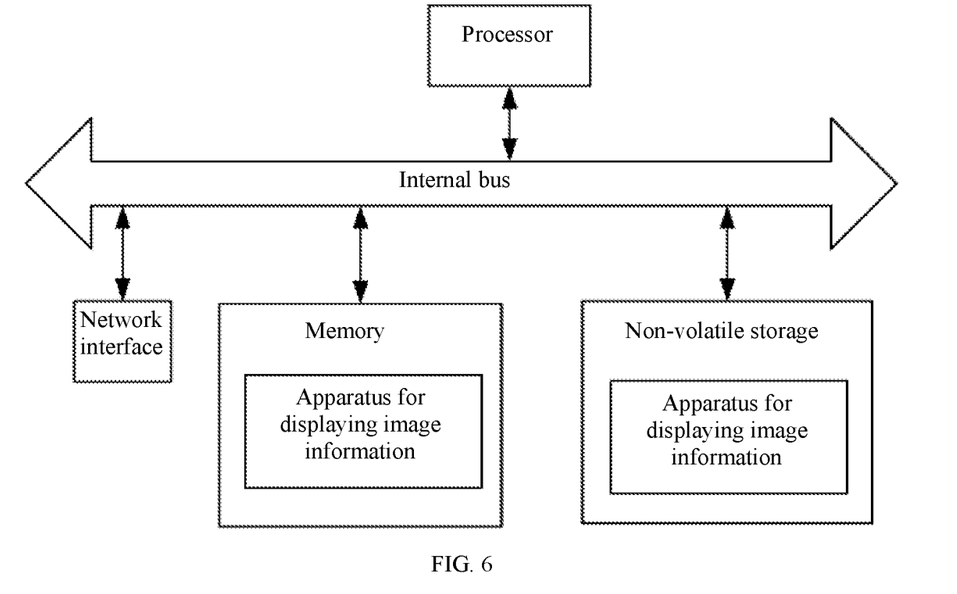
FIG. 6 is a schematic structural diagram of a device on which an apparatus for displaying image information is disposed according to some embodiments.

The embodiments of an apparatus for displaying image information according to the present specification can be applied on terminals. The apparatus embodiments can be implemented by software, hardware, or a combination of software and hardware. Take software implementation as an example, an apparatus in the sense of logics is performed by a processor of the device where the apparatus is configured to read corresponding computer program instructions in a non-volatile storage into the memory. The non-volatile storage may be part of a non-transitory computer-readable storage medium. From the hardware layer, FIG. 6 is a schematic structural diagram of hardware of a device on which an apparatus for displaying image information is disposed according to the present specification. In addition to the processor, network interface, memory, and non-volatile storage shown in FIG. 6, the device on which the apparatus is disposed in the embodiments can further comprise other hardware according to actual functions of the displaying image information, which will not be elaborated by the present specification.

Figure 7:
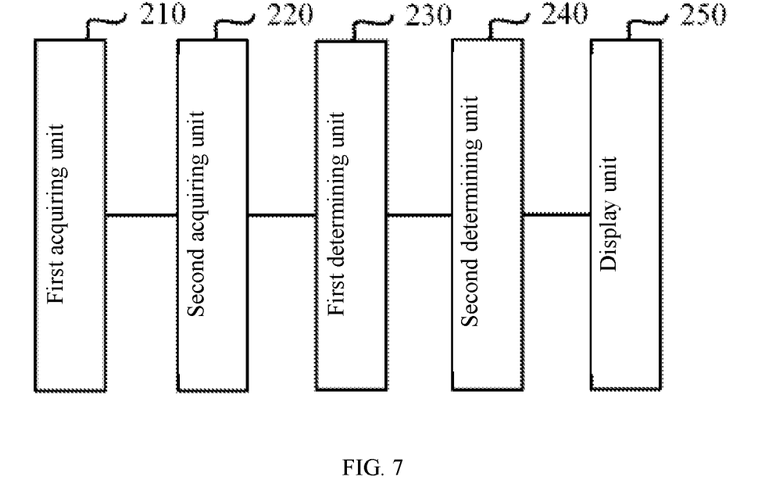
FIG. 7 is a schematic diagram of modules of an apparatus for displaying image information according to some embodiments.

FIG. 7 is a schematic diagram of modules of the apparatus for displaying image information according to some embodiments. The apparatus comprises: a first acquiring unit 210, a second acquiring unit 220, a first determining unit 230, a second determining unit 240, and a display unit 250.

Here, the first acquiring unit 210 is configured to acquire a rotation angle of a terminal; the second acquiring unit 220 is configured to acquire, according to the sensor, a rotation duration of the rotation of the terminal; the first determining unit 230 is configured to determine whether the reported rotation angle reaches a preset threshold value; the second determining unit 240 is configured to determine whether the rotation duration is shorter than a preset duration; and the display unit 250 is configured to, when the reported rotation angle reaches the preset threshold value, and when the rotation duration is shorter than the preset duration, display image information.

In some embodiments, the first acquiring unit 210 comprises: a first acquiring sub-unit configured to acquire, when a preset Application (APP) on the terminal is activated, the rotation angle of the terminal, wherein the image information is included in the preset APP.

In some embodiments, the second acquiring unit 220 comprises: a second acquiring sub-unit configured to acquire a first time when the terminal begins to rotate; a third acquiring sub-unit configured to acquire a second time when the rotation angle of the terminal reaches a preset threshold value; and a determining sub-unit configured to determine a time difference by deducting the first time from the second time as the rotation duration.

In some embodiments, the preset threshold value is an angle range.

In some embodiments, the display unit 250 comprises: a first display sub-unit configured to, when the reported rotation angle reaches the preset threshold value, and when the rotation duration is shorter than the preset duration, determine whether a distance between the terminal and an object detected by a distance sensor is less than a preset distance; and a second display sub-unit configured to display the image information when the distance is less than the preset distance.

In some embodiments, the display unit 250 comprises: a first display sub-unit configured to, when the reported rotation angle reaches the preset threshold value, and when the rotation duration is shorter than the preset duration, determine whether a fingerprint of a user of the terminal is correct; and a second display sub-unit configured to display the image information when the user's fingerprint is correct.

In some embodiments, the apparatus further comprises: a locking sub-unit configured to, when the user's fingerprint is incorrect, place the terminal in an inoperable locked state.

In some embodiments, after the locking sub-unit, the apparatus further comprises: an uploading sub-unit configured to acquire location information of the terminal and upload the location information.

In the embodiments of the present specification, when a rotation angle of a terminal reaches a preset threshold value, and when the rotation duration is shorter than a preset duration, image information can be directly displayed without the need for the user to perform further operations. As such, the image information can be automatically displayed just through rotating the terminal by the user. Since the user does not need to click a button for displaying image information, the operation time is reduced to enable the terminal to rapidly display the image information; moreover, the user can be prevented from clicking an incorrect button, thereby achieving correct display of image information.

In some embodiments, the various modules and units of the apparatus for displaying image information may be implemented as software instructions (or a combination of software and hardware). That is, the apparatus for displaying image information described with reference to FIG. 7 may comprise a processor (e.g., the CPU) and a non-transitory computer-readable storage medium (e.g., the memory) storing instructions that, when executed by the processor, cause one or more components (e.g., the processor) of the apparatus to perform various steps and methods of the modules and units described above. The apparatus for displaying image information may also be referred to as a system for displaying image information. In some embodiments, the apparatus for displaying image information may include a mobile phone, a tablet computer, a PC, a laptop computer, or another computing device.

The implementation processes of corresponding steps in the above-described method can be referenced for detailed description of implementation processes of functions and roles of the units of the above-described apparatus, which will not be elaborated here.

Since the apparatus embodiments substantially correspond to the method embodiments, the description of parts of the method embodiments can be referenced for relevant parts of the apparatus embodiments. The above-described apparatus embodiments are merely exemplary, wherein the units described as separate parts may or may not be physically separated. The parts illustrated as units may or may not be physical units, i.e., they can be located at one place or distributed over a plurality of network units. The objectives of the solutions of the present specification can be achieved by selecting some or all of the modules as needed, which can be understood and implemented by one of ordinary skill in the art without creative effort.

A person of ordinary skill in the art may conceive of other implementation manners of the present specification after considering the description and practicing the disclosed invention. The present specification is intended to encompass any variations, uses or adaptive modifications of the present specification. All these variations, uses, or adaptive modifications may follow the general principles of the present specification and include common general knowledge or common technical means in the art that are not disclosed by the present specification. The description and embodiments are merely exemplary. The present specification is not limited to the accurate structures described above and illustrated in the accompanying drawings, and the present specification can be modified or amended in various manners.

What is claimed is:

1. A method for displaying image information, comprising: when an Application on a terminal is activated, acquiring a rotation angle and a rotation duration of a rotation of the terminal, wherein the activation of the Application permits the acquisition of the rotation angle and the rotation duration, wherein acquiring the rotation duration of the rotation of the terminal comprises:
    obtaining a beginning signal when the terminal begins to rotate;
    acquiring a first time when the terminal begins to rotate based on when the beginning signal is obtained;
    acquiring a second time when the rotation angle of the terminal reaches a preset threshold value; and
    determining a time difference between the first time and the second time as the rotation duration;
    during the rotation of the terminal, obtaining a fingerprint of a user rotating the terminal through a fingerprint scanning button of the terminal; and
    in response to determining that an operation of the terminal is valid:
        displaying, by the terminal through the Application, image information comprising a scannable identifier corresponding to an owner of the terminal; and
        upon the image information being scanned by a scanning device, transferring account information corresponding to the owner of the terminal to the scanning device;
    wherein determining that the operation of the terminal is valid comprises:
        determining that the acquired rotation angle reaches a preset threshold angle value;
        determining that the acquired rotation duration is shorter than a preset duration;
        determining that the user rotating the terminal is the owner of the terminal based on both the terminal detecting a finger of the user remaining pressed on the fingerprint scanning button of the terminal throughout the rotation of the terminal and the fingerprint of the user rotating the terminal matching the owner; and
        determining that a distance between the terminal and the scanning device is less than a preset distance; and
    wherein in response to determining that the operation of the terminal is invalid, the image information is not displayed by the terminal.

2. The method according to claim 1, wherein the preset threshold value is an angle range.

3. The method according to claim 1, wherein the method further comprises:
    when the fingerprint of the user rotating the terminal does not match the owner of the terminal, placing the terminal in an inoperable locked state, wherein the terminal cannot be operated in the inoperable locked state.

4. The method according to claim 3, wherein, after placing the terminal in the inoperable locked state, the method further comprises:
    acquiring location information of the terminal and uploading the location information to a remote server while the terminal remains in the inoperable locked state.

5. A system for displaying image information, comprising one or more processors and one or more non-transitory computer-readable memories coupled to the one or more processors and configured with instructions executable by the one or more processors to cause the system to perform operations comprising:
    when an Application on a terminal is activated, acquiring a rotation angle and a rotation duration of a rotation of the terminal, wherein the activation of the Application permits the acquisition of the rotation angle and the rotation duration wherein acquiring the rotation duration of the rotation of the terminal comprises:
    obtaining a beginning signal when the terminal begins to rotate;
    acquiring a first time when the terminal begins to rotate based on when the beginning signal is obtained;
    acquiring a second time when the rotation angle of the terminal reaches a preset threshold value; and
    determining a time difference between the first time and the second time as the rotation duration;
        during the rotation of the terminal, obtaining a fingerprint of a user rotating the terminal through a fingerprint scanning button of the terminal; and
        in response to determining that an operation of the terminal is valid:
        displaying, through the Application, image information comprising a scannable identifier corresponding to an owner of the terminal; and
        upon the image information being scanned by a scanning device, transferring account information corresponding to the owner of the terminal to the scanning device;
    wherein determining that the operation of the terminal is valid comprises:
        determining that the acquired rotation angle reaches a preset threshold angle value;
        determining that the acquired rotation duration is shorter than a preset duration;
        determining that the user rotating the terminal is the owner of the terminal based on both the terminal detecting a finger of the user remaining pressed on the fingerprint scanning button of the terminal throughout the rotation of the terminal and the fingerprint of the user rotating the terminal matching the owner; and determining that a distance between the terminal and the scanning device is less than a preset distance; and wherein in response to determining that the operation of the terminal is invalid, the image information is not displayed by the terminal.

6. The system according to claim 5, wherein the operations further comprise:

when the fingerprint of the user rotating the terminal does not match the owner of the terminal, placing the terminal in an inoperable locked state, wherein the terminal cannot be operated in the inoperable locked state.

7. A non-transitory computer-readable storage medium configured with instructions executable by one or more processors to cause the one or more processors to perform operations comprising:

when an Application on a terminal is activated, acquiring a rotation angle and a rotation duration of a rotation of the terminal, wherein the activation of the Application permits the acquisition of the rotation angle and the rotation duration, wherein acquiring the rotation duration of the rotation of the terminal comprises:

obtaining a beginning signal when the terminal begins to rotate;

acquiring a first time when the terminal begins to rotate based on when the beginning signal is obtained;

acquiring a second time when the rotation angle of the terminal reaches a preset threshold value; and determining a time difference between the first time and the second time as the rotation duration;

during the rotation of the terminal, obtaining a fingerprint of a user rotating the terminal through a fingerprint scanning button of the terminal; and in response to determining that an operation of the terminal is valid:

displaying, through the Application, image information comprising a scannable identifier corresponding to an owner of the terminal; and upon the image information being scanned by a scanning device, transferring account information corresponding to the owner of the terminal to the scanning device;

wherein determining that the operation of the terminal is valid comprises:

determining that the acquired rotation angle reaches a preset threshold angle value;

determining that the acquired rotation duration is shorter than a preset duration;

determining that the user rotating the terminal is the owner of the terminal based on both the terminal detecting a finger of the user remaining pressed on the fingerprint scanning button of the terminal throughout the rotation of the terminal and the fingerprint of the user rotating the terminal matching the owner; and determining that a distance between the terminal and the scanning device is less than a preset distance; and wherein in response to determining that the operation of the terminal is invalid, the image information is not displayed by the terminal.

8. The storage medium according to claim 7, wherein the operations further comprise:

when the fingerprint of the user rotating the terminal does not match the owner of the terminal, placing the terminal in an inoperable locked state, wherein the terminal cannot be operated in the inoperable locked state.

* * * * *